United States Patent [19]
LaSota

[11] Patent Number: 4,858,992
[45] Date of Patent: Aug. 22, 1989

[54] CONFORMABLE SEAT

[76] Inventor: Larry LaSota, 15745 North Park, East Detroit, Mich. 48021

[21] Appl. No.: 156,328

[22] Filed: Feb. 16, 1988

Related U.S. Application Data

[63] Continuation-in-part of Ser. No. 785,202, Oct. 7, 1985.

[51] Int. Cl.⁴ .............................................. A47C 3/00
[52] U.S. Cl. ..................................... 297/284; 297/458
[58] Field of Search ............................... 297/284, 458

[56] References Cited

U.S. PATENT DOCUMENTS

| | | |
|---|---|---|
| 3,545,808 | 12/1970 | Gescheidle . |
| 3,697,133 | 10/1972 | Wolofski . |
| 4,153,293 | 5/1979 | Sheldon . |
| 4,155,592 | 5/1979 | Tsuda et al. . |
| 4,309,058 | 1/1982 | Barley . |
| 4,339,150 | 7/1982 | McNamara et al. . |
| 4,354,709 | 10/1982 | Schuster . |
| 4,452,485 | 6/1984 | Schuster . |
| 4,462,655 | 7/1984 | Lance ................................. 297/284 |
| 4,545,614 | 10/1985 | Abu-Lsa et al. ..................... 297/284 |

Primary Examiner—Francis K. Zugel
Attorney, Agent, or Firm—Basile and Hanlon

[57] ABSTRACT

A seat which is conformable to the shape and position of a user. A conformable apparatus is mountable within the seat and includes a plurality of belts which extend laterally across the seat. A plurality of sensors, one associated with each of the belts, are provided to detect the shape and position of selected portions of the user's torso on the seat. A control circuit, responsive to the sensors, controls movement of sliders mounted within channels within the conformable apparatus to control the length and shape of the belts so as to vary the length of the belts to conform the belts and the overlying seat fabric to the shape of the user.

24 Claims, 13 Drawing Sheets

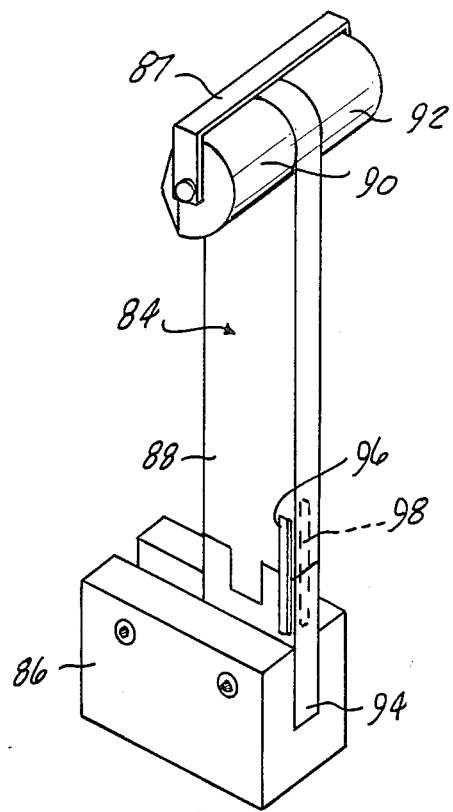
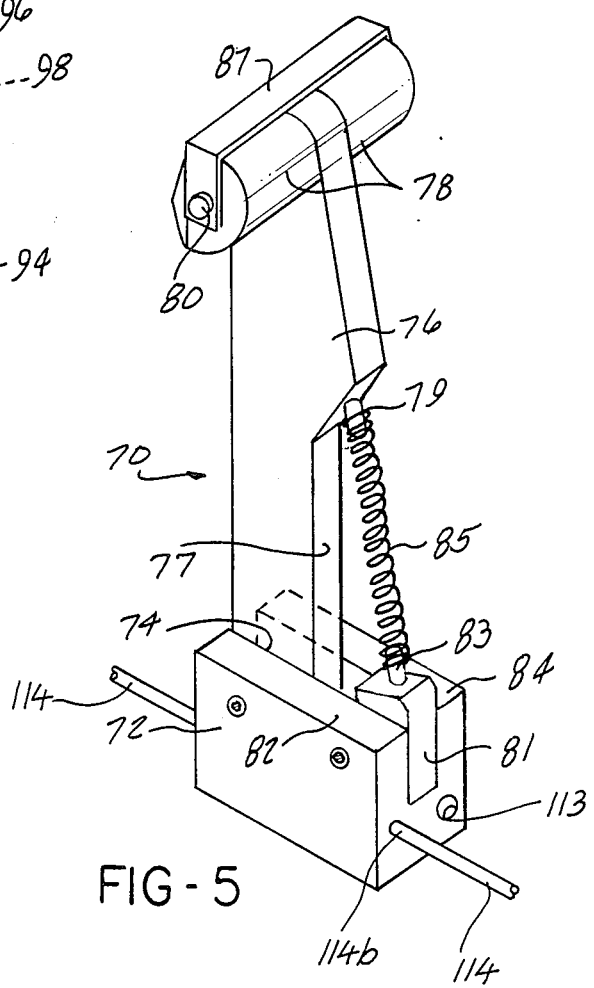
FIG-6
FIG-5

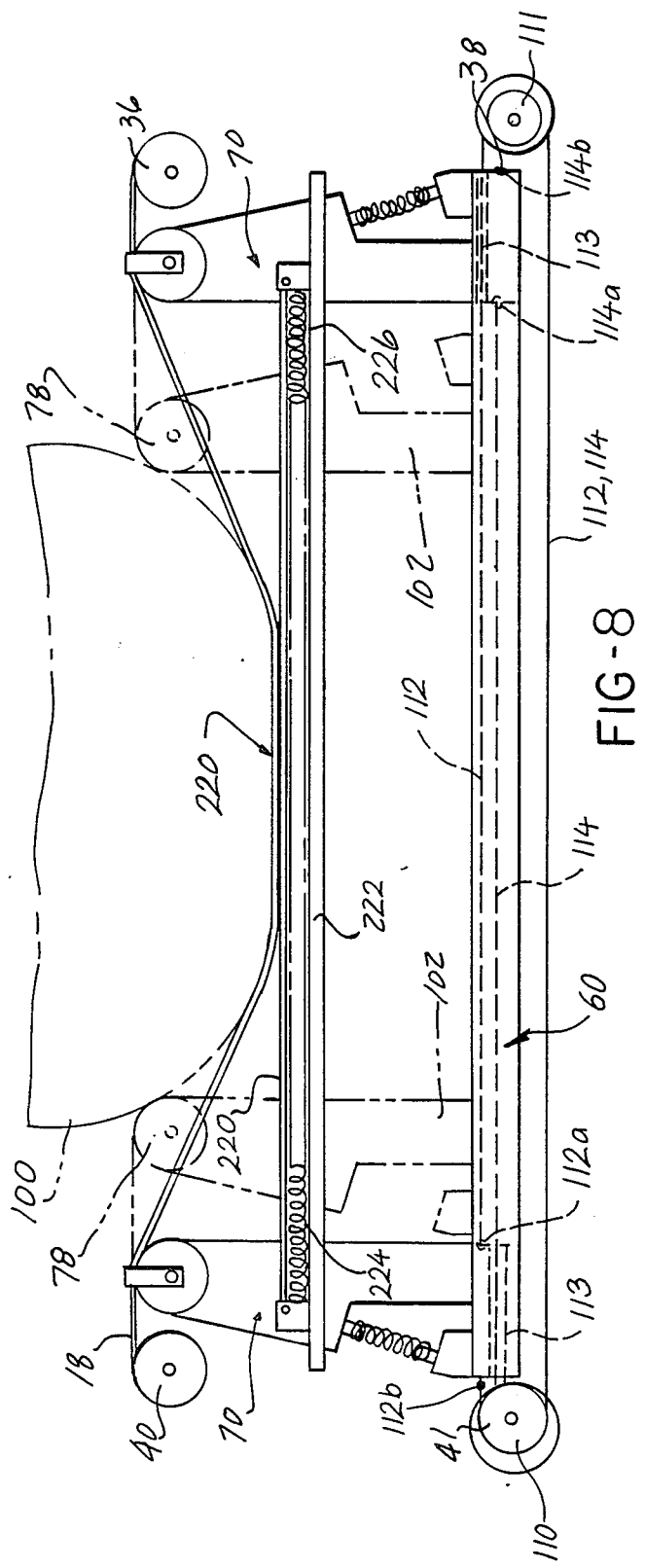

CONFORMABLE SEAT

CROSS-REFERENCE TO CO-PENDING APPLICATION

This application is a continuation-in-part application of co-pending application Ser. No. 785,202, filed on Oct. 7, 1985, in the name of Lawrence LaSota and entitled "Conformable Seat".

BACKGROUND OF THE INVENTION

1. Field of the Invention

This invention relates, in general, to seats and, more particularly, to seats which conform to the shape of the user.

2. Description of the Prior Art

In the seating industry, various types of seats have been developed to increase the comfort of the user, particularly in the lumbar region of the back. Such seats are particularly designed for use in motor vehicles, such as automobiles or trucks. Such seats are provided with special configurations, areas of extra padding, or springs and resilient members which conform the shape of the seat more closely to the particular shape of the user.

However, such seats are designed in a particular configuration so as they cannot be extensively adjusted or vary in form for different users and/or different positions of a user on the seat. Thus, it would be desirable to provide a seat which can conform to the shape of different users, as well as different user positions on the seat.

SUMMARY OF THE INVENTION

The present invention is a seat which is conformable to the shape and position of the user. The seat includes a conformable assembly mounted within the seat bottom, seat back, or extending between the seat bottom and seat back. The conformable assembly includes a plurality of belts which extend laterally across the seat. The belts are mounted within a frame positioned within the seat.

A plurality of sensors, one associated with each belt, are provided for detecting the shape and position of the user on the seat in the area of each belt. A control circuit, responsive to the sensors, controls the movement of a pair of slider members mounted within channels in the frame which support opposite ends of each belt. The slider members conform the shape of each belt to the shape and position of the user's body on the seat.

First and second shuttle members slide within vertically spaced tubular members mounted on one side of the frame. The shuttle members selectively engage pulleys attached to the slider members or rotatable sections mounted on the upper tubular member to engage the rotatable tubular members with each rotatable section or pulley. A drive mechanism rotates the tubular members to effect movement of the slider members to the desired position within each channel, as well as varying the length of each belt.

A control mechanism includes a transmission which selects either of the rotatable tubular members for rotation and drives a stepper motor which increments the shuttle members selectively along each tubular member.

The sensors comprise an elongated bar mounted above each channel which carries two resistance coils. A foil member is mounted above the two resistance coils and is urged into contact with the resistance coils under pressure of the belt when the user sits on the seat. The resistance coils are connected as potentiometers which provide an output voltage signal to a central processor, such as a microprocessor or computer. The central processor functions to store the input signals from the sensors and, after all inputs have been received, energizes the transmission and stepper motor to move the shuttle members along each tubular member between each belt location.

A second motor drives a shaft to which retractor arms connected to opposite ends of each sensor are mounted. The second motor rotates the retractor arms to bring the sensors into an upward sensing position and retracts the sensors after the output signals have been input to the central processor for positioning of each belt.

The conformable seat of the present invention provides a unique seat which is conformable to the shape of many different users and even a single user when the user changes or alters his position in the seat. By varying the shape and tension of a series of belts extending along the seat bottom, the seat of the present invention may be altered in its shape so as to conform precisely to the shape of the user legs and/or back. This provides increased comfort for the user since the seat is conformed to the shape of the user's body.

BRIEF DESCRIPTION OF THE DRAWING

The various features, advantages and other uses of the present invention will become more apparent by referring to the following detailed description and drawing in which:

FIG. 5 is an enlarged perspective view showing one of the slider members;

FIG. 6 is an enlarged perspective view of an alternate version of the center slider members employed with the forwardmost belt on the seat;

FIG. 8 is an enlarged cross sectional view generally taken along line 8—8 in FIG. 2;

FIG. 19 is a side elevational view of the seat shown in FIG. 18;

DESCRIPTION OF THE PREFERRED EMBODIMENTS

Figure 1:
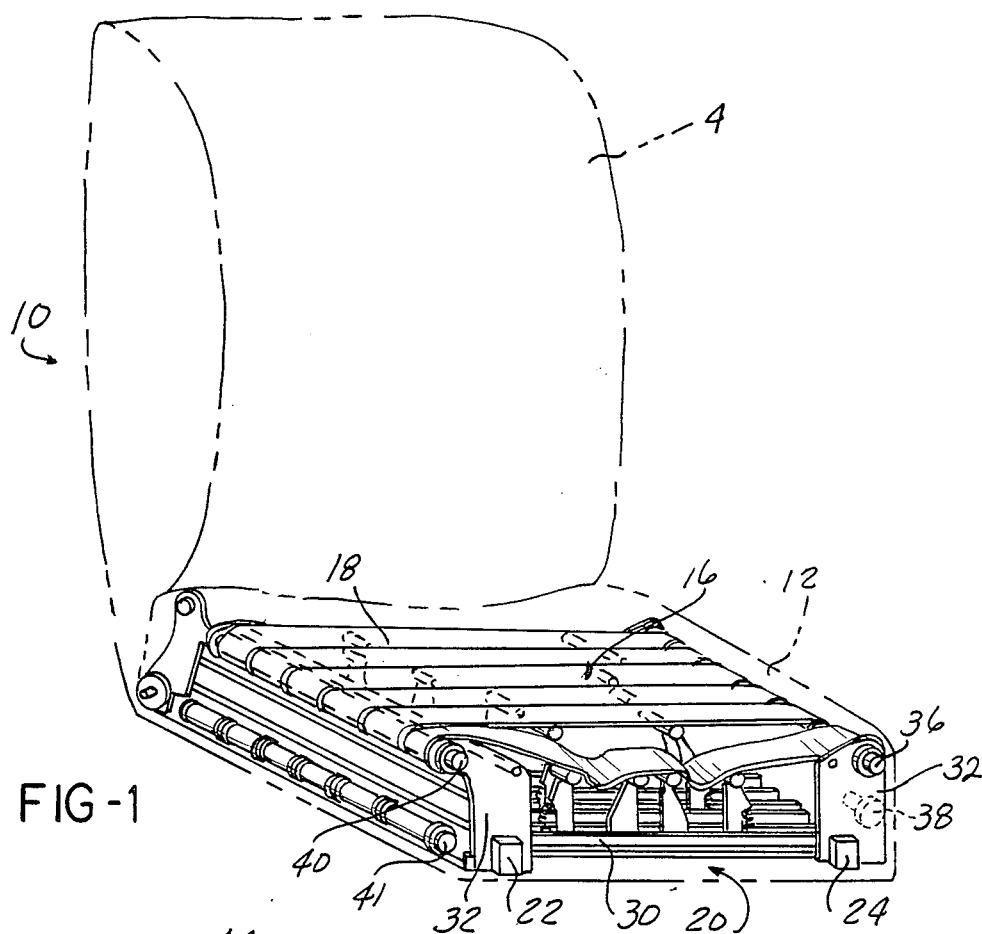
FIG. 1 is a perspective view of a conformable seat constructed in accordance with the teachings of the present invention.

Throughout the following description and drawing, an identical reference number is used to refer to the same component shown in multiple figures of the drawing.

Figure 2:
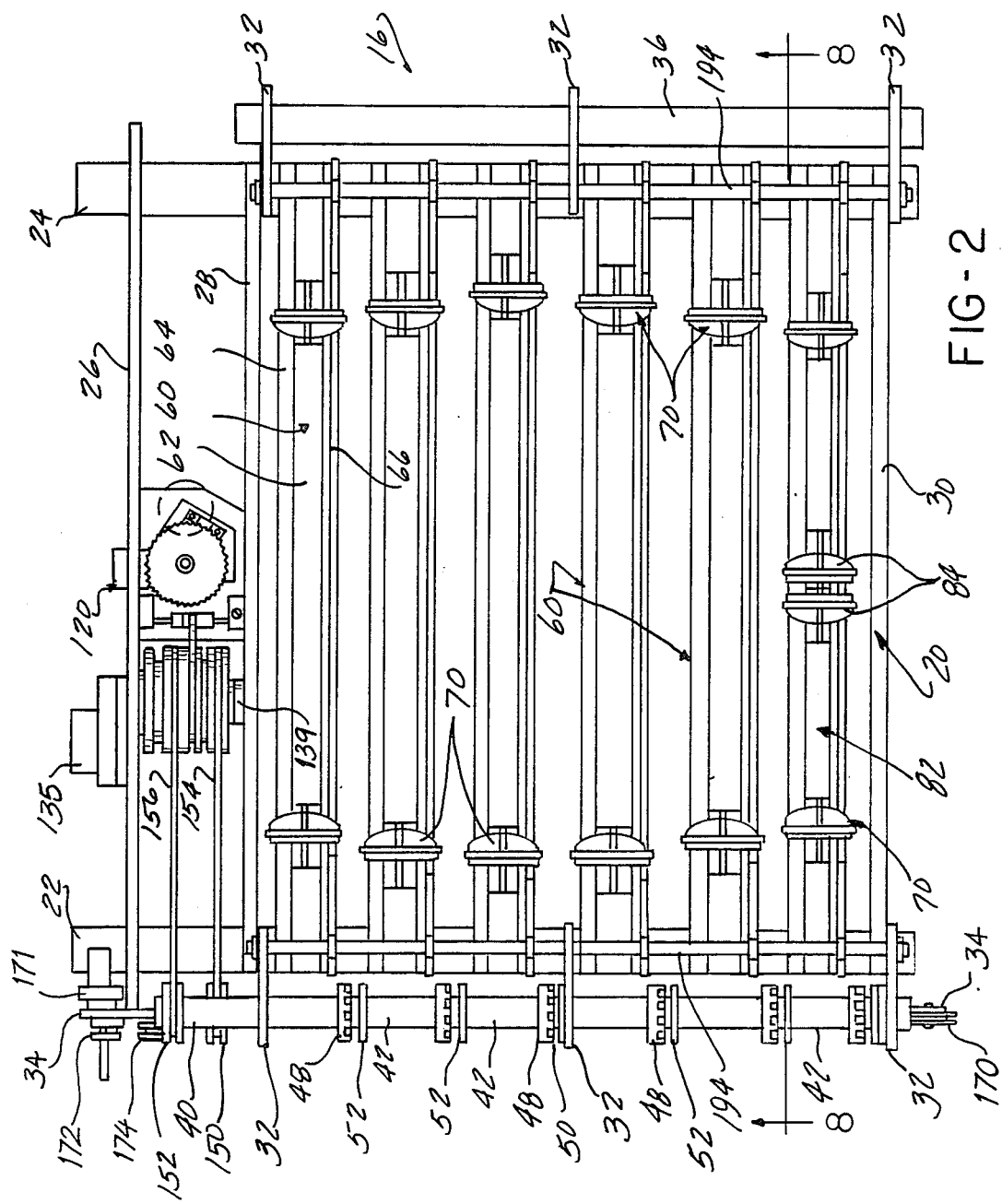
FIG. 2 is a plan view of the seat shape adjusting apparatus of the present invention.
Figure 3:
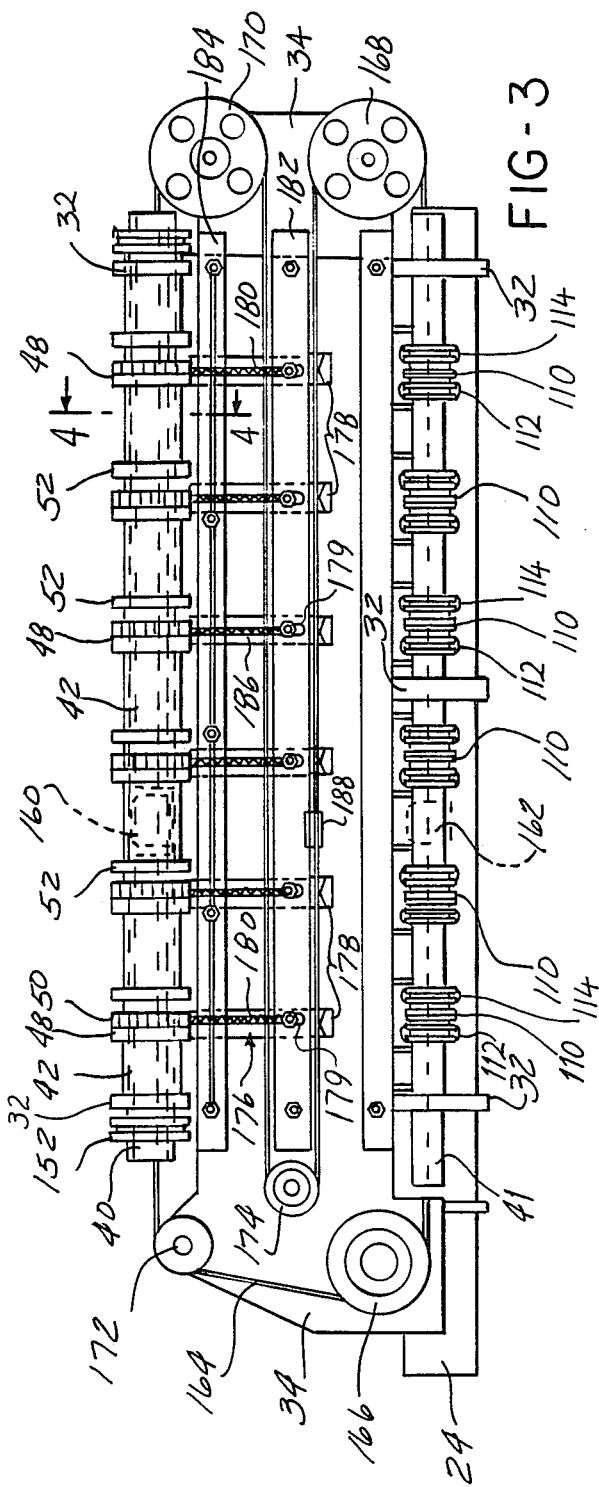
FIG. 3 is a left hand, side elevational view of the seat shape adjusting apparatus shown in FIG. 2.

Referring now to the drawing and, to FIGS. 1, 2 and 3 in particular, there is illustrated a seat 10 which conforms to the shape of the user despite his size and/or position on the seat 10. From the outset, it will be understood that the seat 10 of the present invention is described and illustrated by way of example only and not limitation as a seat mountable within a vehicle, such as an automobile, truck, etc. Such seats typically have a seat bottom 12 and a fixed or pivotal seat back 14.

However, the seat 10 could also be formed in an integral shape, such as a seat for a home or office, as well as a foldable seat for use in collapsible wheelchairs. Further, the seat and the features forming the conformability of the seat may also be employed to advantage in beds, particularly beds used for invalids and in hospitals.

By way of example only, the seat 10 is formed of a seat bottom 12 which is fixably mounted on the floor of the vehicle and a pivotally mounted or stationary seat back 14. The seat bottom 12 and seat back 14 are covered with a suitable material, such as cloth, vinyl, etc.

The features described hereafter providing the desired conformability may be employed in either or both of the seat bottom 12 and seat back 14 as well as on the intermediate portion between the seat bottom 12 and seat back 14 or between the seat bottom 12 and the seat back 14.

The conformable seat 10 of the present invention is provided with a seat shape adjusting apparatus denoted in general by reference number 16 in FIG. 1. By way of example only, the seat shape adjusting apparatus 16 is mounted only in the seat bottom 12. It will be understood, however, that the seat adjusting apparatus 16 may also be employed separately or simultaneously in the seat back 14.

As shown in FIG. 1, the seat shape adjusting apparatus 16 includes a plurality of spaced belts 18 which extend laterally across the seat between the ends of a frame denoted generally by reference number 20 which is mounted within the seat bottom 12 and fixably attached to the floor of the vehicle. The belts 18 underlie the upper fabric of the seat bottom 12 and provide a support structure which enables the upper fabric of the seat bottom 12 to conform to the shape and position of the user on the seat.

Referring now to FIG. 1 and, in greater detail to FIGS. 2 and 3, the frame 20 is formed with first and second spaced rails 22 and 24 which span and are joined to first, second and third, spaced, cross members 26, 28 and 30, respectively.

A plurality of upwardly extending, support arms 32 are mounted in a spaced apart manner on the frame rails 22 and 24 and extend upward and laterally outward therefrom. An elongated plate member 34 is mounted on one side of the frame 20 and is secured between the rail 22 and the support arms 32 as shown in FIG. 3.

Upper and lower, spaced, hollow tubular members 36, 38, 40 and 41 are supported above the rails 22 and 24 on the outer extension of the support arms 32 on opposite sides of the frame 20. The tubular members 40 and 41 are rotatably mounted in aligned apertures formed in the support arms 32; while the tubular members 36 and 38 are fixably mounted in the opposed support arms 32 for purposes which will be described in greater detail hereafter.

Figure 4:
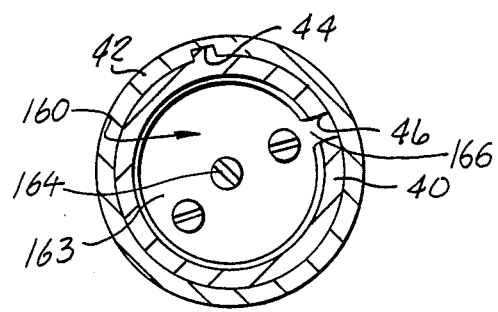
FIG. 4 is a cross sectional view generally taken along line 4—4 in FIG. 3.

A plurality of rotatable tubular sections 42 are rotatably mounted about one of the tubular members, such as tubular member 40. The rotatable sections 42, as shown in FIGS. 2 and 3 and in greater detail in FIG. 4, are formed with an interior slot 44. The slot 44 is alignable with an elongated slot 46 formed along the length of the tubular member 40. The number of rotatable tubular sections 42 corresponds to the number of belts 18 mounted on the seat shape adjusting apparatus 16 of the present invention. The number of belts 18 can be varied as needed depending upon the length of the seat 10.

Each of the rotatable tubular sections 42 has a gear 48 mounted thereon which includes a plurality of circumferentially spaced sprockets or openings 50. A guide member 52 is also mounted on each rotatable section 42 and spaced from the gear 48. The guide member 52 acts as a side support guide for the belt 18 extending around each tubular section 42. One end of each belt 18 is attached to one of the rotatable tubular sections 42 which acts as a releasable reel.

Referring now to FIGS. 2, 5, 6 and 7 there is illustrated a plurality of slider members 70 which are positioned between the tubular members 36, 38, 40 and 42. The slider members 70 ride in channels, such as channel member 60 shown in FIGS. 2 and 7, one for each of the belts 18. The channel members 60 have a generally U-shaped configuration formed of a bottom wall 62, upstanding side walls and inwardly extending, upper, spaced flanges 64 and 66.

First and second slider members, such as slider member 70 shown in FIG. 5, are mounted within each channel 60. Each of the slider members 70 is identically constructed and has a base 72 with an internal slot 74 which receives an upstanding rib 76. The rib 76 supports a pair of outwardly extending arms 78 which are joined to the rib 76 at its upper end by a fastener, such as a bolt 80. The upper surfaces 82 and 84 of the base 72 ride within the channel 60 below the upper flanges 64 and 66. In this manner, each of the sliders 70 is adapted for sliding movement transversely inwardly and outwardly along each channel member 60 as described below.

Further, each rib 76 is formed with a cutout portion 77 which includes a projection 79. A pivotal member 81 is mounted in the base 72 and also is formed with a projection 83. The projections 79 and 81 support a biasing spring 85 which enables pivotal movement of the slider members 70 under inertial loads imposed on the seat 10.

A clip 87 having a generally U-shaped configuration is mounted in a spaced apart manner above the arms 78 on each slider member 70. The clip 87 functions to receive one of the belts 18 therebetween and maintain the belt 18 in position on the arms 78.

In an alternate embodiment shown in FIGS. 2 and 6, the frontmost channel 82 is provided with a second pair of sliders 84. Each of the sliders 84 is identically constructed of a base 86 substantially identical to the base 72 shown in FIG. 5 and an upstanding rib 88 which supports a pair of outwardly extending arms 90 and 92 and a clip 87 at an upper end. However, the sliders 84 are adapted to fit between the inside of the legs of the user of the seat 10 to provide support for this area of the user's body. For safety factors, a breakaway feature is provided in the sliders 84 which consists of mounting the rib 88 in a support member 94 which is secured in position in the base 86. A pair of spring metal strips 96 and 98 are mounted between one end portion of the rib 88 and the support member 94. This allows sideways movement of the rib 88 in the event of forward movement of the user from the seat 10 and prevents the sliders 84 from injuring the user of the seat 10 in the event of sudden forward movement of the user.

The outwardly extending arms 78, 90 and 92 on the sliders 70 and 84 support one of the belts 18 and conform the belt 18 to the shape of the particular portion of the user's body in that area of the user's body on which the belts 18 are located. The belts 18 as shown in FIG. 1 are disposed over each of the arms 78, 90 and 92 which enable the belt 18 to drop below the arms 78, 90 and 92 between each pair of sliders 70 or 84. Each belt 18 is secured at one end to the fixed tubular member 36 and at the other end to one of the rotatable tubular sections 42 in a retractable and extensible reel.

FIG. 8 illustrates the functioning of the sliders 70 in changing the shape and tension on one of the belts 18 along the seat 10 to adjust the shape of the belt 18 to the shape of the user's torso denoted in general by reference number 100. Upon movement of the sliders 70, after the position of the user's torso 100 has been sensed, the sliders 70 will be moved inward to a position denoted by reference number 102 and shown in phantom in FIG. 8 in which the arms 78 on the upper end of each of the sliders 70 are located in close proximity to the edges of the user's torso 100. This changes the shape and configuration of the belt 18 to more closely approximate the shape of the user's torso and provides a more comfortable support for the user of the seat 10.

Figure 7:
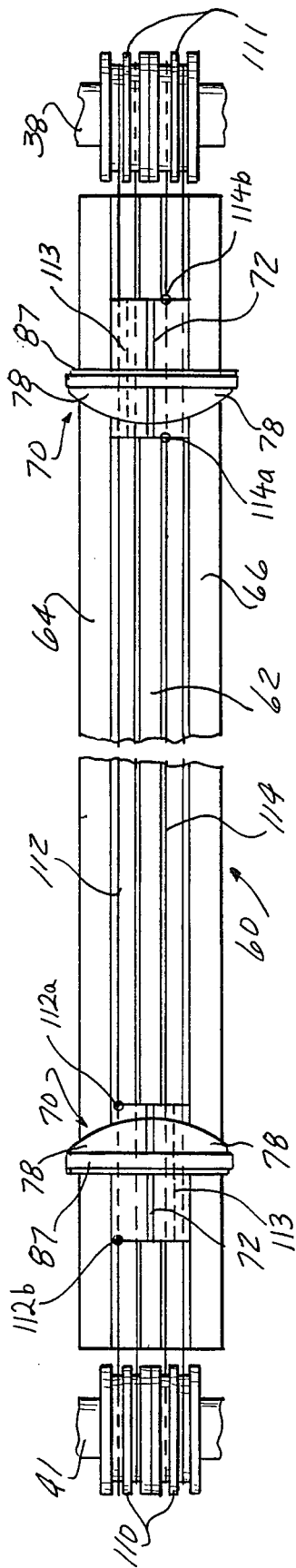
FIG. 7 is an enlarged plan view of one channel and pair of slider members shown in FIG. 2.

Slider moving means are also provided for moving each slider sequentially within each channel 60. As shown in FIGS. 3 and 7, a plurality of double pulleys 110 are rotatably mounted on the tubular member 41 and two are associated with each belt 18.

A single double pulley, denoted in FIG. 7 in general by reference number 111 is mounted on the opposite tubular member 38. For each pair of slider members 70, a pair of cables 112 and 114 are provided, with the cables 112 and 114 extending between pulleys 110 and 111. Particularly, the cable 112 is fixedly connected at one end 112a to the left hand slider 70, as viewed in FIG. 7, and extends through a bore 113 formed in the right hand slider 70 tightly, around the pulley 111, underneath the channel 60 tightly, around one of the pulleys 110 to a fixed connection 112b at a rear edge to the left hand slider 70. The cable 112 makes a plurality of loops around the pulley 110 since the tubular member 41 makes several rotations in extending the slider 70 to conform the belt 18 to the shape and position of the user on the seat 10.

A similar cable 114 is used for the right hand slider 70 and is connected in a similar manner around the pulleys 110 and 111 to provide sequential movement of the slider 70 as described below.

Figure 9:
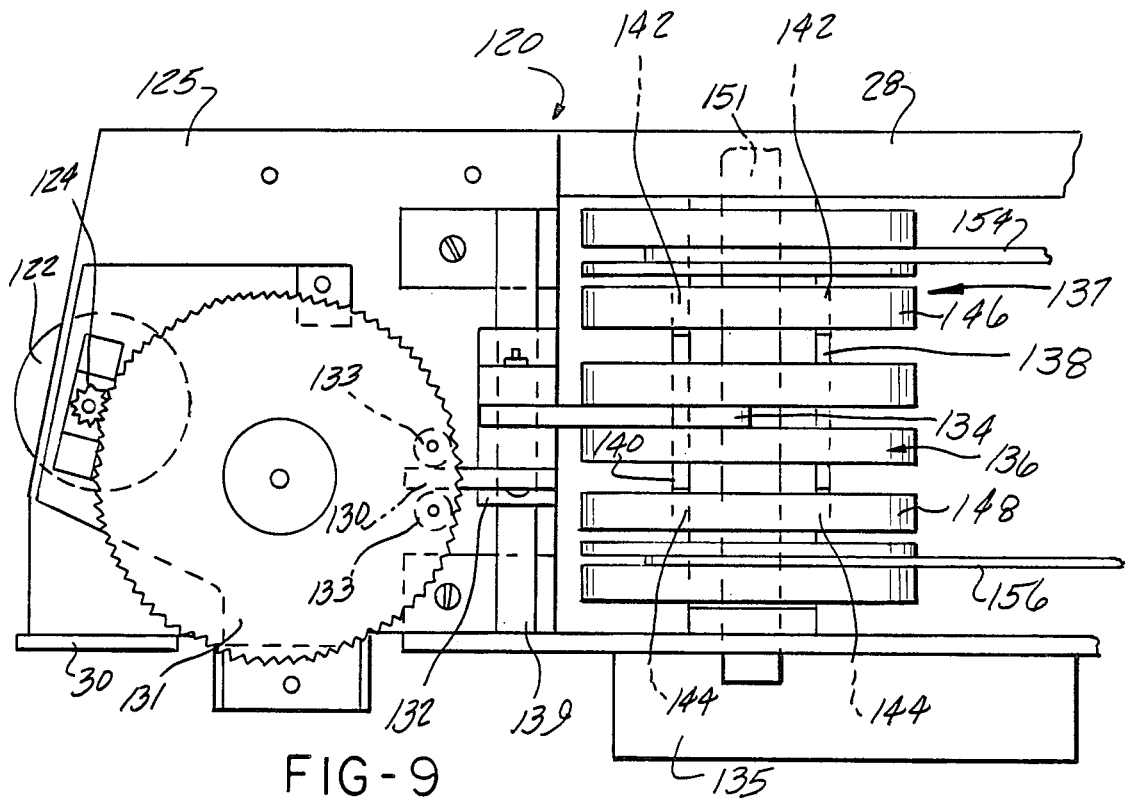
FIG. 9 is an enlarged plan view of the transmission employed in the present invention.
Figure 10:
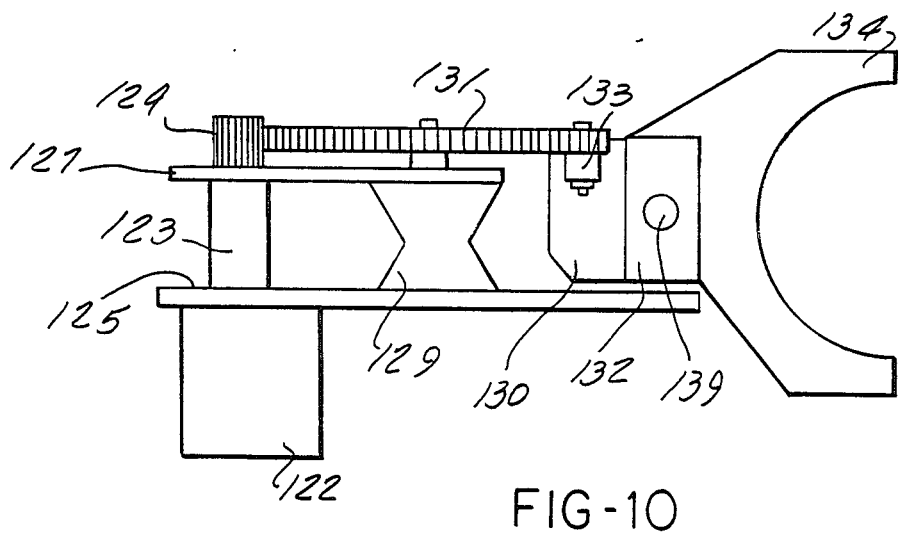
FIG. 10 is an elevational view of the transmission shown in FIG. 9.
Figure 11:
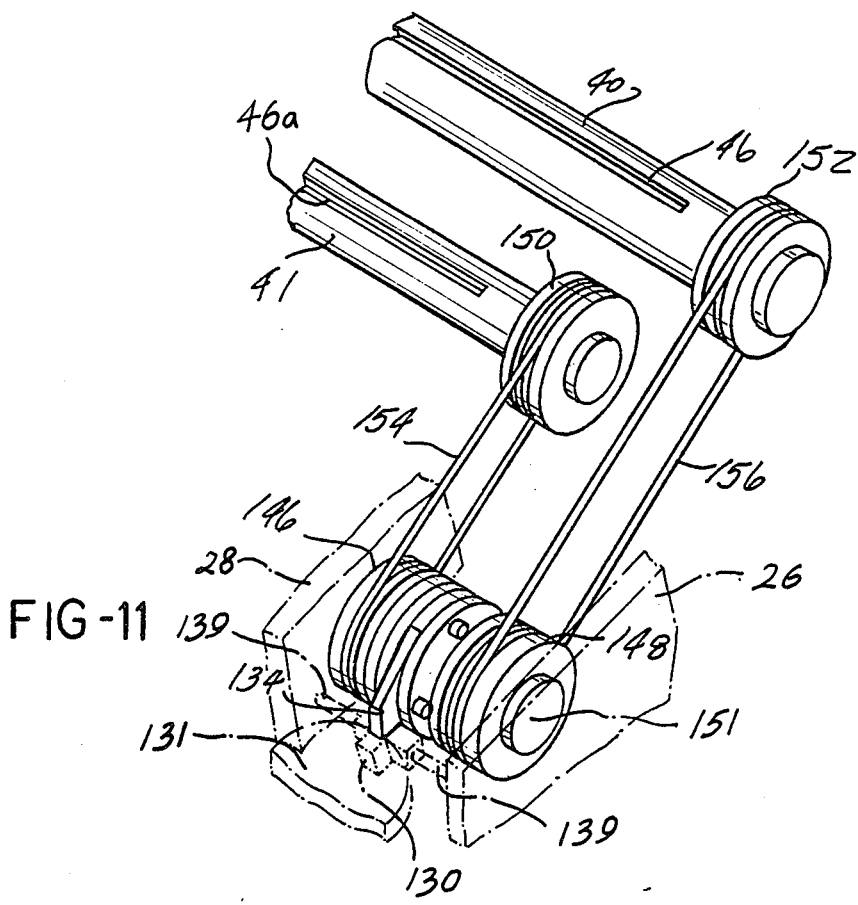
FIG. 11 is an enlarged, partial view showing the connection between the transmission and the tubular member.

The drive mechanism for rotating the tubular members 40 and 41 will now be described. The means for rotating the tubular members 40 and 41 includes a main drive motor 135, shown at the top in FIG. 2, whose output shaft is operably coupled to the shaft 151 about which two pulleys 146 and 148, shown in FIGS. 2 and 9, are mounted. As shown in FIG. 11, the pulleys 146 and 148 are connected to a second pair of pulleys 150 and 152, respectively, which are mounted on the ends of the tubular shafts 40 and 41, the shafts 40 and 41 being rotatably mounted in the frame of the seat. Which pulley 146 and 148 is selected for rotating one of the tubular members 40 and 41 is controlled by the transmission 120 shown in detai in FIG. 9 and described below. Rotation of the motor 122 in the transmission 120 through the gears drives an arm or yoke 134 operably coupled to a first pulley 136 mounted between pulleys 146 and 148. The pulleys 146 and 148 are rotatably mounted about the shaft 151 which is coupled to the output of the main drive motor 135.

With reference to FIGS. 2, 3, 9, 10 and 11, the drive means also includes a transmission 120 which includes a motor 122 whose output shaft 123 drives a primary gear 124. The motor 122 is preferably a reversible, bi-directional electric motor which rotates the primary gear 124 in either of two directions. The motor 122 and the primary gear 124 are mounted between spaced mounting plates 125 and 127 which are, in turn, mounted between the rear cross members of the frame. A secondary gear mounting plate support 129 is mounted between the spaced plates 125 and 127 and supports a secondary gear 131 which is rotatably mounted and meshingly engages the primary gear 124.

A pair of guide drive rollers 133 are mounted on a peripheral edge of the secondary gear 131 and are rotatable therewith. A guide member 130 extends between the guide drive rollers 133 and is movable upon movement of the secondary gear 131.

A block member 132 is slidably mounted on a transversely extending shaft 139 for transverse movement along the shaft 139.

An arm or yoke 134 is mounted centrally on the block 132 and is movable therewith. The arm 134 is positioned between the first pulley 136 and controls the transverse movement of the pulley 136 along the shaft 151 to which it is keyed or fixed upon movement of the secondary gear 131.

Outwardly extending pins 138 and 141 extend from the sides of the pulley 136 and are engagable with slots 142 and 144, respectively, formed in adjacently positioned pulley sections 146 and 148, respectively. In this manner, the central pulley 136 selectively engages either of the adjacently positioned pulleys 146 and 148 depending upon the direction of rotation of the motor 122.

The pulleys 146 and 148 are connected to corresponding pulleys 150 and 152 mounted on the ends of the tubular members 40 and 41, respectively, by means of cables 154 and 156, respectively, as shown in FIG. 11. In this manner, rotation of either of the tubular members 40 and 41 can be selected by means of the transmission 120. Referring briefly to FIG. 2, a main drive motor 135 is mounted on the cross frame member 26. The output shaft of the drive motor 135 is operably coupled to the shaft 151 about which the pulleys 146 and 148 are mounted. Thus, energization of the drive motor 135 causes rotation of the shaft 151 and one of the pulleys 146 and 148 engaged by the pulley 136. This provides rotational movement to either of the tubular members 40 and 41 as selected by the operably coupled pulleys 146 or 148 engaged by the arm 134 and pulley 136 as described above.

Figure 12:
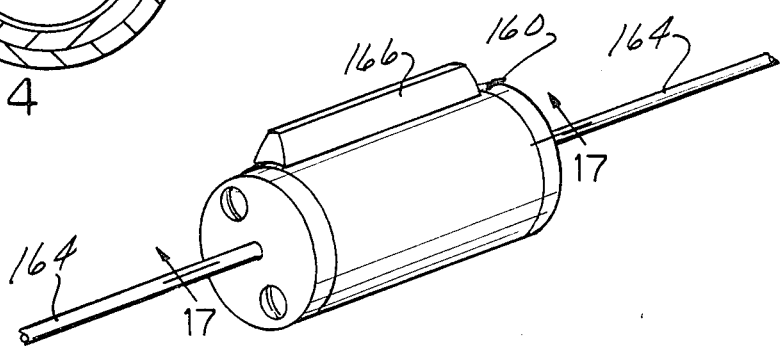
FIG. 12 is a perspective view of one of the shuttle members.
Figure 17:
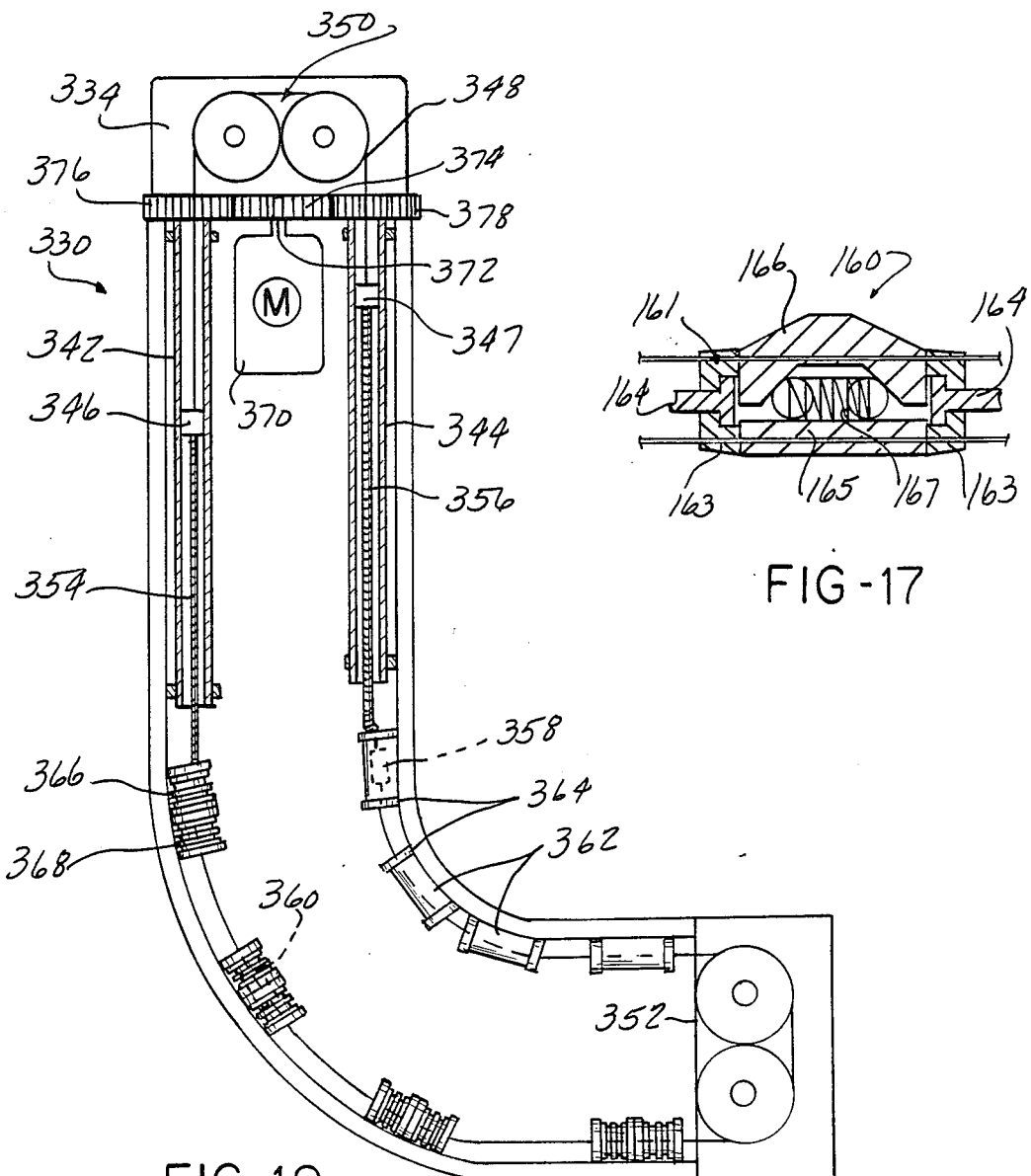
FIG. 17 is a cross-sectional view generally taken along line 17—17 in FIG. 12.

Referring to FIGS. 3, 12 and 17, selection of the sprockets 48 on the tubular member 40 and the rotatable sections 42, as well as the pulleys 110 on the tubular member 41, is controlled by means of shuttle members 160 and 162 which are slidable within the tubular members 40 and 41, respectively.

As both shuttle members 160 and 162 are identically constructed, only shuttle member 160 will be described in detail. The shuttle member 160 is in the form of a cylindrical body 161 formed of two end plates 163 which are secured, by means of suitable fasteners, to the main body housing 165.

A blade 166 extends through an aperture formed in the central housing 165 and is biased outward by means of a biasing spring 167 outward from the housing 165.

The shuttle member 160 is mounted on the cable 164 by forming a generally T-shaped section at the end of the cable 164 which is secured in a complimentary formed recess in the end plates 163 of the housing 161 of the shuttle member 160. The ends may be soldered into secure engagement with the end plate 163. However, due to the fastening means employed to mount the central body portion 165 to the end plates 163, the shuttle member 160 including the outwardly extending blade 166 is free to rotate about the access of the cable 164 so as to enable engagement of the blade 166 with the slots 44 and 46 in the surrounding tubular members.

The blade 166 slides within the slot 46 formed within the tubular member 40 and engages the slot 44 in successive rotatable members 42 mounted about the tubular member 40 when the slots 44 and 46 are rotated into alignment. This locks the tubular member 40 in rotational engagement with succesive ones of the tubular sections 42 so as to cause rotation of one of the tubular sections 42 and the sprocket gear 48 mounted thereon. Thus, the slots 44 and 46 can be aligned upon rotation of the tubular member 40 within the member 42 and engaged by the blade 166 of the shuttle 160 shown in FIG. 12 for simultaneous rotation of the tubular members 40 and 42. This supplies a change in the length of the belt 18 mounted about the rotatable member 42 and the associated fixed end of the belt.

The opposite shuttle member 162 is also rotatably mounted on the cable 164. The shuttle member 162 slides within the tubular member 41 in a corresponding slot 46a similar to that shown in FIG. 4 to selectively engage a slot formed interiorially within each of the pulleys 110. This provides selection of one of the pulleys 110 to move the attached slider member 70 on the cables 112 and 114 to an appropriate position within the channel 60.

A stepper motor 171 mounted on the plate 34 is operably coupled to one of the pulleys 166, 168, 170 or 172, such as pulley 172 as shown in FIG. 2, and when energized by the control system, moves the cable 164 between each position. This enables either of the shuttle members 160 and 162 to selectively engage the appropriate rotatable member 42 or one of the pulleys 110, respectively, in a concurrent or sequential manner. It will be understood that the motor 171 can be initially energized to move the shuttle member 160 between successive positions along the tubular member 40 to successively engage adjacent rotatable members 42 and thereby change the length of the belts 18 and then be re-energized to advance the shuttle member 162 between successive pulleys 110 to adjust the sliders 70 and 84 to the appropriate position to conform the belts 18 to the shape and position of the user of the seat 10. The shuttle members 160 and 162 may also be moved concurrently if desired.

Figure 21:
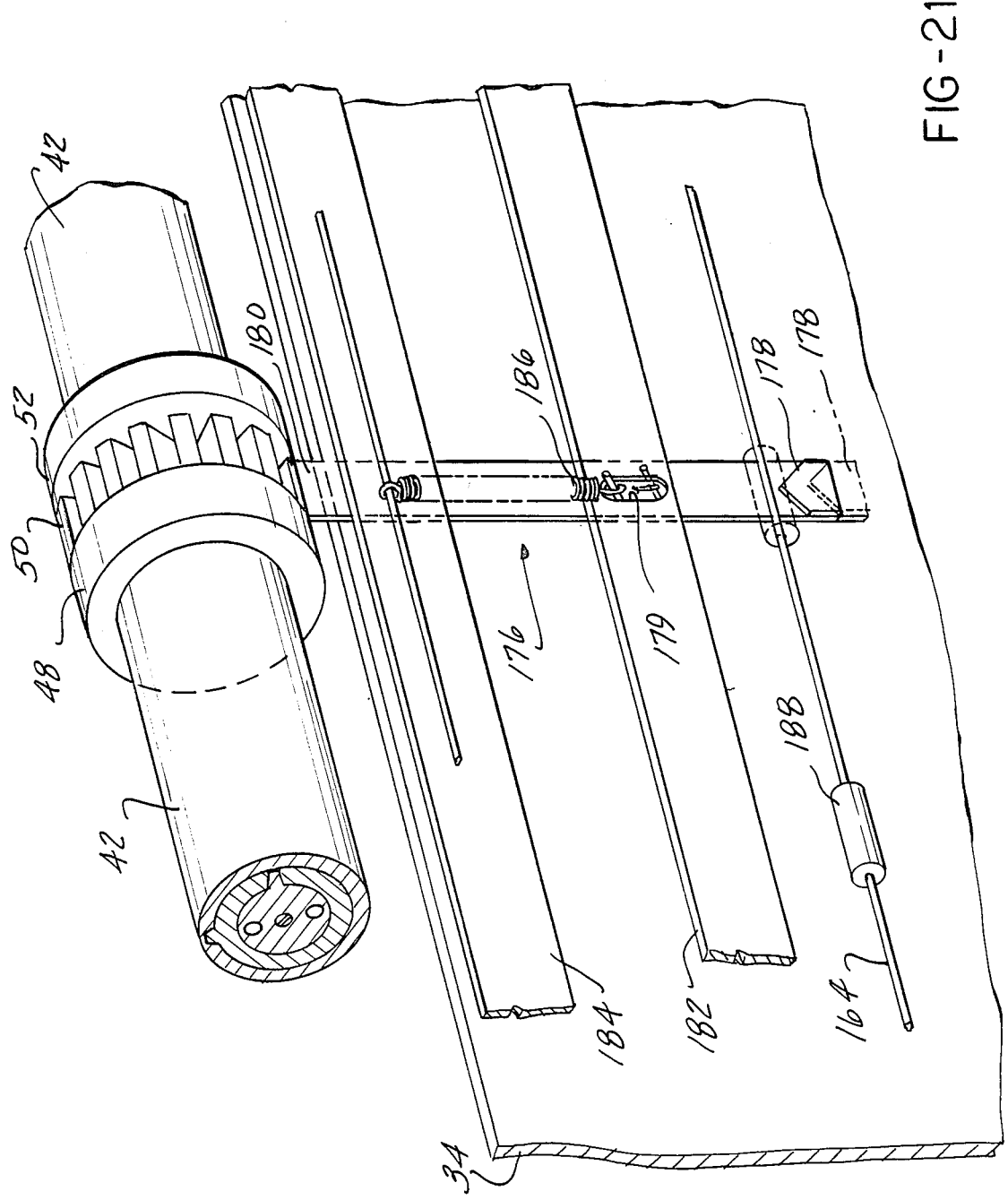
FIG. 21 is a partial, enlarged, perspective view of sprocket locking means depicted in FIG. 3.

As shown in FIG. 3, the cable 164 extends in a continuous loop from a wind-up wheel 166 around pulleys 168, 170 and 172 and 174 which are mounted on the plate 34. Sprocket locking means denoted in general by reference number 176 provides locking of the sprockets 50 on the rotatable members 42. A plurality of cams 178 are slidably mounted between the exterior surface of the plate 34 and a center bar 182 and upper bar 184 as shown in FIGS. 3 and 21. Each of the cams 178 includes an outwardly extending finger 180 which extends upward from the upper bar 184 mounted on the plate 34 into engagement with one of the sprockets 50 on the gears 48. This locks the gear 48 into the selected position thereby providing the desired shape to the belt 18 mounted about the associated rotatable member 42.

Biasing springs 186 are mounted on the upper bar 184 at one end and extend through a slot 179 in the center bar 182 at the opposite end to bias the fingers 180 into engagement with the sprockets 50. This biasing force is provided by attaching the lower end of the springs 186 through the slot 179 to the bottom end of the cam finger 180. A wedge lock 188 is also mounted on the cable 164 for movement along with the shuttle members 160 and 162.

In operation, movement of the shuttle member 160 through the tubular member 40 is accompanied by concurrent, synchronized movement of the wedge lock 188 between the cams 178 associated with the sprocket gear 50 with which the shuttle member 160 is currently engaged. The wedge lock 188 engages the cam 178 associated with the sprocket gear 60 engaged by the shuttle member 160 and urges it downward, as shown in phantom in FIG. 21, thereby disengaging the finger 180 from the sprocket 50 and enabling rotation of the rotatable member 42 to dispense the desired length of the belt 18. Movement of the wedge lock 188 to the adjacent cam 178 will release the previous cam 178 under the bias of the spring 186 so that the finger 180 engages the previous sprocket 50 thereby locking the adjacent rotatable member 42 in the desired position and providing the desired length to the belt 18 mounted about the adjacent rotatable member 42. In this manner, the rotatable members 42 are selectively released from engagement with the fingers 180 which locks them in a fixed rotation so as to enable the shuttle member 160 to engage the slot 44 in one of the rotatable members 42 and connect rotation of the tubular member 40 and one of the selected rotatable members 42 and provide the desired change in the length and resultant shape of the belt 18.

Figure 15:
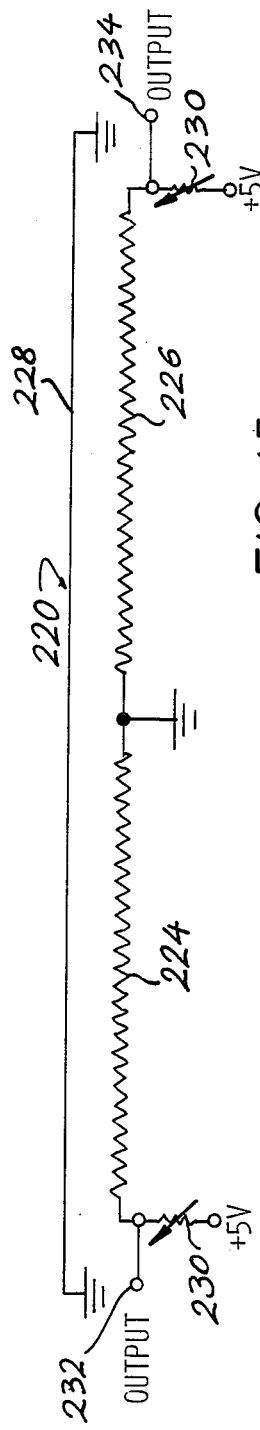
FIG. 15 is a schematic diagram showing the connection of the resistance wires in the sensing means.

The conformable seat 10 of the present invention also includes means for sensing the shape of the user of the seat 10 at various portions along the user's torso. Sensing means, denoted in general by reference number 220 in FIGS. 8 and 13, includes a plurality of elongated bars 222 each of which is located underneath the center of one of the belts 18. First and second resistance coils 224 and 226, respectively, are mounted on the top of each bar 222 and connected to a source of electrical power as shown in FIG. 15. An electrical conductor or foil 228 is mounted on the bar and extends across the length of the resistance coils 224 and 226.

Figure 13:
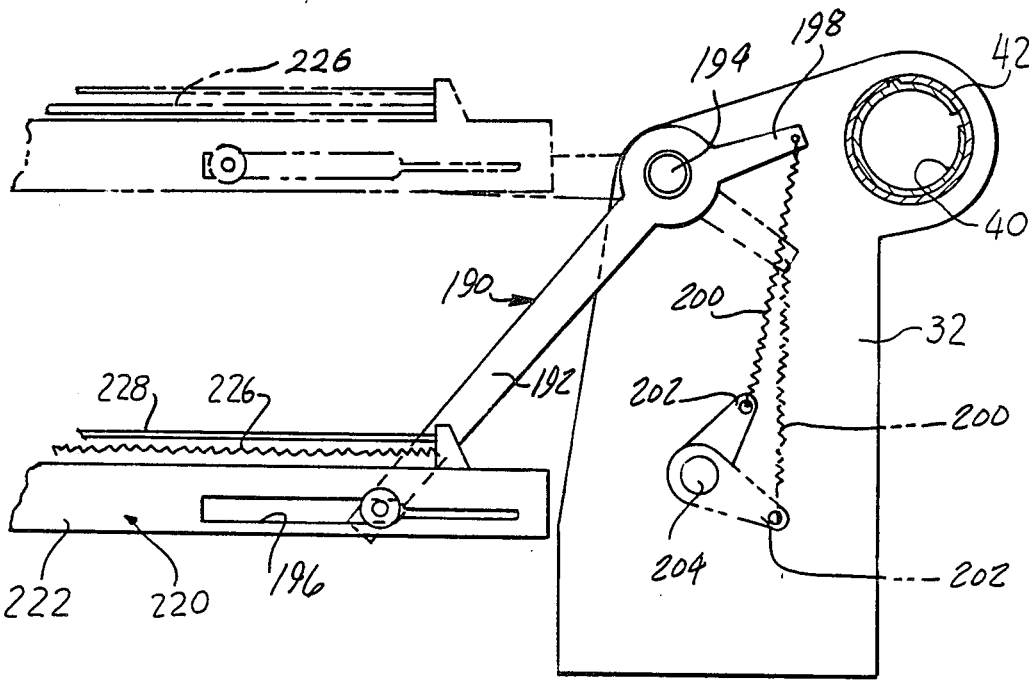
FIG. 13 is an enlarged view showing the retractors for the sensing means.

Each bar 222 is movable between a first, retracted or lowered position, shown in FIG. 13 to a raised, second position shown in phantom in FIGS. 8 and 13. Retractor means 190 mounted on the support members 32 and connected to each bar 222 moves the sensing means 220 and bar 222 between the raised and lowered positions. The retractor means 190 includes a plurality of members each having an arm 192 which is rotatably mounted about a shaft 194 extending through the support members 32 along both sides of the frame 20, as shown in FIGS. 2 and 13. One end of the arm 192 is slidably mounted within a channel 196 at each opposite end of the bar 222.

A flange 198 extends outwardly from the arm 192. The outward end of the flange 198 is connected via a biasing means, such as a coil spring 200, to a link 202 which is mounted about one of a pair of shafts 204 extending between the support members 32 in the frame 20.

Figure 14:
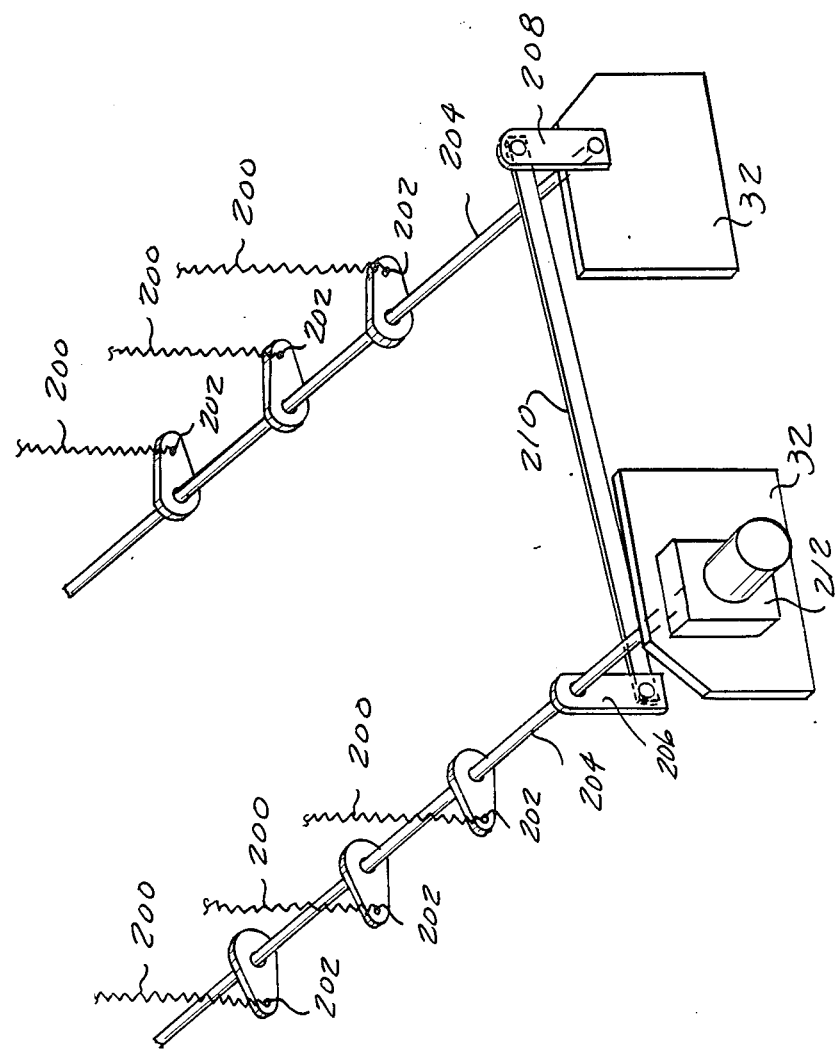
FIG. 14 is an enlarged, perspective view showing the sensor retractor mechanism.

As shown in FIG. 14, a linkage including rotatable members 206, 208 and a cross link 210 is connected between the shafts 204 on opposite sides of the frame 20. One of the shafts 204 is driven by a reversible, bi-directional electric motor 212.

The motor 212, driven by the control system described below, causes rotation of both of the shafts 204 through the linkage to pivot the links 202 between a first position shown in solid in FIG. 13 and a second position shown in phantom in FIG. 13. This, through the biasing spring 200, causes movement of the retractor means 190 between the first, lowered position and the second, raised position.

In operation, the motor 212 is energized to move the sensors 220 to the raised position shown in FIG. 8 to sense the position and shape of the user's torso 100 on the seat 10. This will cause the position of the foil 228 corresponding to the user's shape and position on the seat 10 to be brought into contact with the resistance coils 224 and 226 to provide a pair of voltage signals to the control unit which correspond to the position and shape of the user's torso or body on the belt. After storage in the memory of the control unit, as described hereafter, the control unit will generate a signal to energize the motor 212 which rotates the linkage 210 to retract the links 202 thereby causing a lowering movement of the sensors 220 and the bars 222 to the lowered position shown in FIG. 13.

Figure 16:
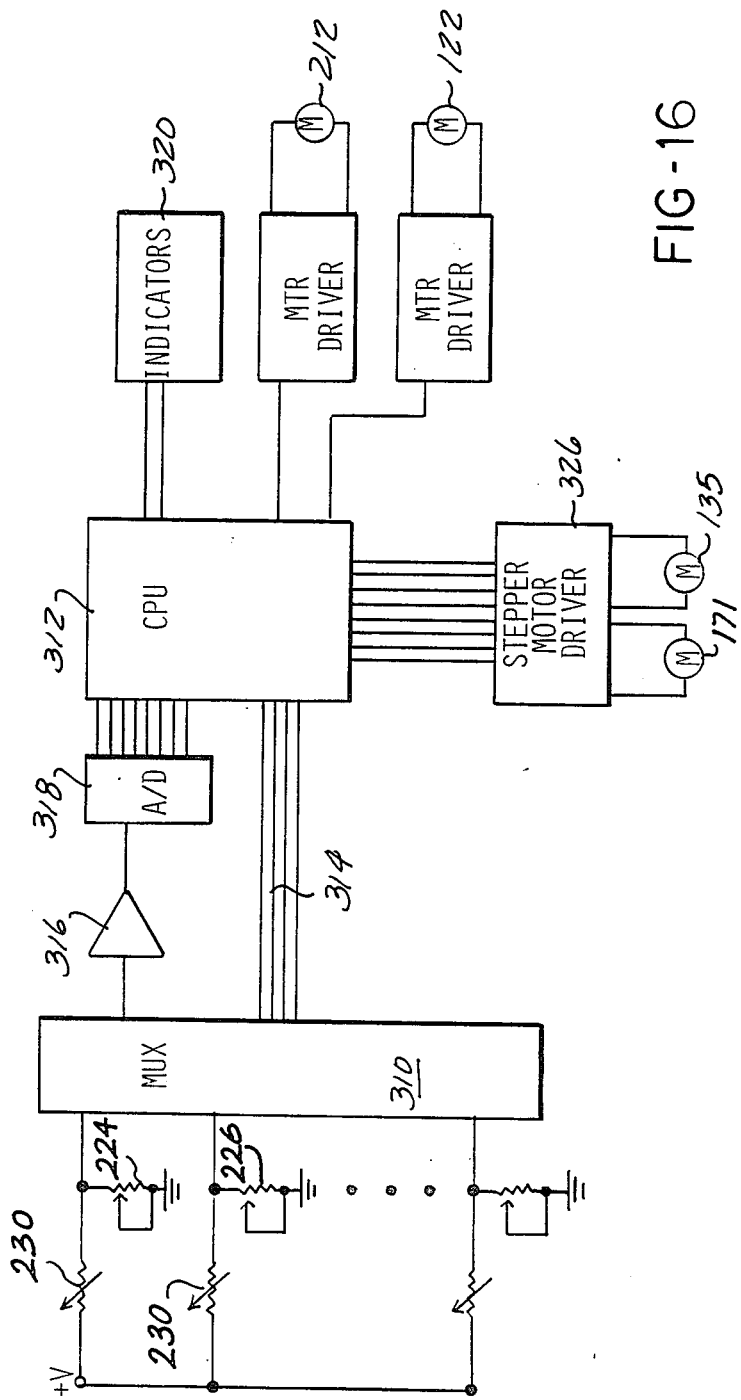
FIG. 16 is a schematic diagram showing the control circuitry used to operate the present invention.

Referring now to FIGS. 15 and 16, there is illustrated a control means for operating the conformable seat 10 of the present invention. As illustrated in FIG. 15, the foil 228 is disposed above the resistance coils 224 and 226. A source of voltage is connected through a resistor 230 to the resistance coils which are grounded at a center connection point. Outputs 232 and 234 are provided between the resistors 230 and the resistance coils 224 and 226, respectively, to provide a pair of voltage outputs to the control unit. Two such outputs are provided for each belt 18 on the seat 10, only a few of which are shown in FIG. 16.

The outputs 232 and 234 from the sensors are input to a multiplexer 310 which is under the control of a central processing unit 312, such as a conventional microprocessor or computer. The central processing unit 312 generates address signals on address lines 314 to the multiplexer 310 to control the selection of the inputs 232 and 234 from successive sensors 220 along the length of the seat 10. The output from the multiplexer 310 is input through an amplifier 316 and an analog/digital converter 318 to the central processing unit 312.

The central processing unit 312 executes a stored program which is operative, upon energization from an input push button 320 to energize the motor 212 to pivot the sensors 220 to the raised position for sensing the shape and position of the user on the seat 10.

The central processing unit 312 also controls the operation of the stepper motors 137 and 171 through a stepper motor driver assembly 326 which controls the operation of the shuttle members 160 and 162, and, also controls the operation of the drive motor 122 to drive the tubular members 40 and 41.

Figure 18:
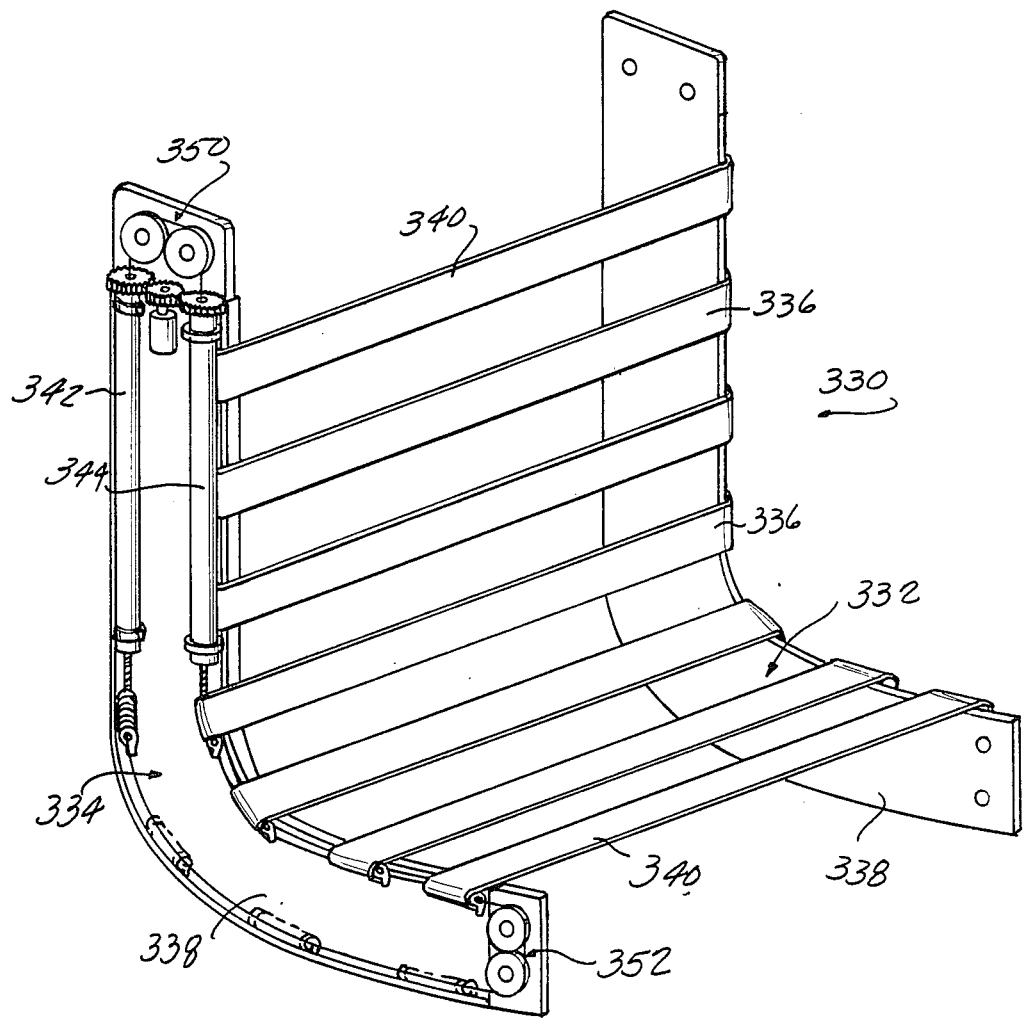
FIG. 18 is a perspective view of another embodiment of the conformable seat of the present invention.

Referring now to FIGS. 18 and 19, there is illustrated another embodiment of the conformable seat of the present invention in which the side frame has an arcuate shape so as to dispose the conformable belts immediately between the seat back and seat bottom or in the lumbar region of a unitary seat to provide comfort to the user in this area of the seat.

The frame 330 is formed with two arcuately shaped side panels 332 and 334 each of which has a first upright standing section 336 and a curved lower portion 338. The side plates 332 and 336 are spaced apart on opposite sides of the seat and support the plurality of belts 340 therebetween.

At the upper first portion 336 of each of the side plates 332 and 334 there are mounted a pair of spaced, substantially vertically extending rotatably tubular members 342 and 344. A rotatable drive shuttle member 346 is movably mounted within each hollow tubular member 342 and 344 and moves therealong. Each drive shuttle member 346 is rotatably connected to an elongated cable 348 which extends around pulley sets 350 and 352 mounted at opposite ends of each of the side plate 332 and 334.

A central portion of the cable on opposite sides of each side plate 332 or 334 is replaced by a flexible drive cable 354 and 356, respectively. The flexible drive cable is connected at one end to the drive shuttle members 346 and at an opposite end to a driven shuttle member 358 and 360, respectively. The driven shuttle members 358 and 360 have an oval, egg-like shape to enable their passage through rotatable pulleys and tubular sections as described hereafter. The opposite end of the drive cable 348 is attached to the opposed end of each of the driven shuttle members 358 and 360. Further, each of driven shuttle members 358 and 360 is provided with outwardly extending blades, similar to those employed in the shuttle member 160 described above for respectively engaging and causing rotation of the rotatable tubular members and pulleys as described hereafter.

A plurality of rotatable tubular members 362 are rotatably mounted between brackets 364 attached to the upper edge of each of the side plates 332 and 334. The rotatable members 362 are hollow and receive the driven shuttle member 358 therethrough to impart rotation to successive rotatable members 362 as the shuttle member 358 advances successively through each rotatable member 362. This provides the desired elongation of the belts 340 as described above so as to conform the shape of the belt to the shape of the user of the seat. Associated with and spaced from each rotatable member 362 is a pair of pulleys also mounted on each of the side plates 332 and 334 but on the outward or lower edge of each of the side plates 332 and 334. Each pair of pulleys, such as pulleys 366 and 368, are mounted by means of suitable brackets to the side plates 332 and 334.

The pulleys are identical to the pulleys 110 shown in FIG. 3 and operate in the same manner to control the position of the slider members, not shown in FIGS. 18 and 19, which aid in conforming the shape of each of the belts 340 to the shape of the user on that portion on the seat. The pulleys 366 and 368 are hollow and receive one of the driven shuttle members 360 therethrough which imparts selective rotation to the pulleys to conform the slider members to the particular shape to the user in the same manner as described above.

A drive motor 370 mounted on one of the side plates 332 or 334 and controlled by the control means of the present invention has its output shaft 372 connected to a main drive gear 374. A pair of secondary gears 376 and 378 are rotatably affixed to one end of each of the rotatable tubular members 332 and 334, respectively for imparting bi-direction rotation of the motor 370 to each of the drive tubes 342 and 344. This imparts rotation to each of the drive shuttle 346 and 347 which ride within slots formed within each of the drive tubes 342 and 344 to cause rotation of each of the drive shuttles 346 and 347, the flexible cables 354 and 356 attached thereto and to impart such rotation to each of the driven shuttles 358 and 360. This enables selective rotation of the rotatable members 362 and pulley pairs 366 and 368 in the same manner as described above to conform the belts 340 and slider members to the shape of the user although along a curved, arcuate path which is suited for positioning in the lumbar region of the seat.

The above-construction applies for the left hand slide plate 334 shown in the orientation in FIGS. 18 and 19. The opposed or right hand side plate 332 is similarly formed but in a reversed or posed manner. However, the drive tubes, slider controlling pulleys are reversed, the lower curved section of the side plate 332 has the rotatable drive tubes mounted thereon; while the upper straight portion has the rotatable tubular members and pulleys mounted thereon. In this manner, clean adjustment of all portions of the belts 340 along the length of the seat may be obtained to conform the belts 340 and the overlying seat fabric to the shape of the user of the seat.

Figure 20:
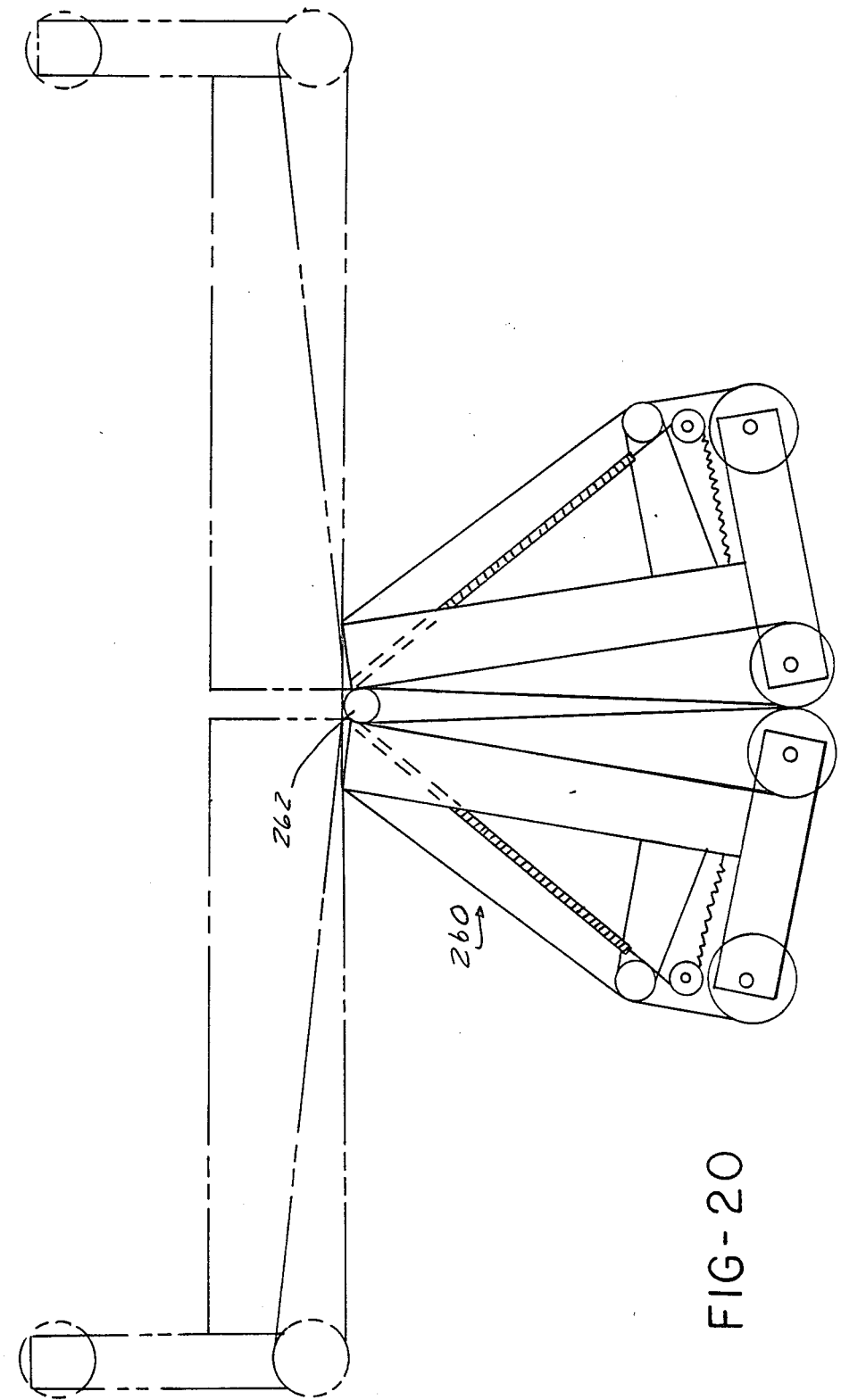
FIG. 20 is a front elevational view of yet another embodiment of the conformable seat of the present invention.

Referring now to FIG. 20, there is shown yet another embodiment of the present invention wherein the conformable seat 260 of the present invention is provided with a centrally located foldable connection to enable the seat 260 to be utilized on a foldable chair such as a wheelchair. In this embodiment, at the center portion of the frame, the sensors are provided with a central pivot point 262 which enables their collapsibility from the extended position shown in phantom in FIG. 20 to the collapsed position shown in solid in FIG. 20. Suitable lock means may be employed to lock the frame in the extended position in use.

In summary, there has been disclosed a unique seat for use in vehicles, wheelchairs, residential seating and even beds which uniquely conforms to the shape of the body of the user. The conformable seat of the present invention senses the shape and position of the user at various positions along the length of the seat or bed, stores such sensed information in a memory under the control of central processor which then controls the movement of slider members along channels formed at various portions along the length of the seat to adjust the shape and tension of belts supporting the fabric of the seat. This enables each portion of the seat to be adjusted to conform exactly to the shape of the user's torso at that portion along the seat to provide complete comfort for the user. The seat of the present invention is also conformable whenever desired by the user at different positions of the user on the seat as well as different sized and shaped users.

What is claimed is:

1. A conformable member comprising:
   a frame;
   first and second tubular members mounted on opposite sides of the frame, the first tubular member being rotatably mounted on the frame;
   a plurality of belts disposed retractably mounted on the frame and extending over the upper ends of the first and second tubular members;
   means for adjusting the shape of each belt individually to conform the shape of the belt to the shape and position of the body of the user on the conformable member; and
   means for sensing the shape and position of the user along successive portions on the conformable member.

2. The conformable member of claim 1 wherein the sensing means comprises:
   a plurality of bars mounted on the frame, one bar being associated with each belt;
   first and second resistance wires mounted in each bar and connected to a source of electrical power;
   a grounding wire mounted on each bar and spaced above the first and second resistance wires, the grounding wire being brought into engagement with and contacting selected portions of the first and second resistance wires by the belt as the user sits on the conformable member, the first and second resistance wire providing first and second voltage outputs.

3. The conformable member of claim 1 wherein the belt shape adjusting means comprises:
   a plurality of channels mounted on the frame;
   first and second slider members mounted within each channel and movable along the length of each channel;
   each slider member having a channel engaging portion and a rib extending upward from the channel engaging portion;
   support means mounted on the upper end of the rib for supporting the belt thereon; and
   means for moving the first and second slider members in each successive channel to vary the shape of the belt between the first and second slider members in conformance with the shape of the user on the belt.

4. The conformable member of claim 3 further including means for varying the length of each belt.

5. The conformable member of claim 4 wherein the means for varying the length of each belt comprises:
   a plurality of tubular sections rotatingly mounted over the first tubular member, each tubular section being associated with one belt and having one end of each belt attached thereto;
   a plurality of gears, one of which is fixedly mounted on each tubular section;
   lock means, engagable with each gear for locking each gear and its associated tubular section in a selected rotary position;
   means for coupling one of the tubular sections to the first tubular member for simultaneous rotation with rotation of the first tubular member; and
   means for unlocking the lock means to allow rotation of the gears.

6. The conformable member of claim 5 wherein the lock means comprises:
   a wedge shaped member;
   a plurality of fingers mounted on the frame;
   a cam mounted on the end of the finger and movably mounted on the frame; and
   means mounted on the frame for moving the wedge-shaped member into engagement with successive cams to release the arm from the gear to allow rotation of the gear.

7. The conformable member of claim 6 wherein the moving means comprises:
   a cable mounted on the frame;
   the wedge-shape member being fixedly mounted on the cable;
   motor means for moving the cable, the motor means being operative to move the cable and the wedge-shaped member between consecutive lock means to successively unlock each lock means from its associated gear.

8. The conformable member of claim 7 wherein the coupling means comprises:
   a shuttle member rotatably attached to the cable;
   the shuttle member having an outwardly extending, biased blade slidably disposed within the first tubular member;
   a first slot formed in the first tubular member, the blade being slidable within the first slot;
   a second slot formed in the interior of each tubular section engagable by the blade as the shuttle member progressively traverses the first tubular member to couple successive tubular sections to the first tubular member for simultaneous rotation therewith.

9. The conformable member of claim 3 further including third and fourth tubular members mounted on opposite sides of the frame, the third and fourth tubular members being spaced from the first and second tubular members, respectively, the third tubular member being rotatably mounted on the frame.

10. The conformable member of claim 9 wherein the means for moving the first and second slider members in each successive channel includes:
    pulley means rotatably mounted on the pulley member and associated with each pair of first and second slider members;
    means for coupling one of the pulley means to the third tubular member for simultaneous rotation therewith upon rotation of the third tubular member.

11. The conformable member of claim 10 wherein the pulley coupling means comprises:
    a second shuttle member rotatably attached to the cable;
    the shuttle member having an outwardly extending, biased blade slidingly disclosed within the third tubular member for movement therealong;
    a first slot formed in a tubular member, the blade being slidable through the first slot;
    a second slot formed in the interior of each pulley means engagable by the blade as the second shuttle member presently traverses the third tubular member to successively couple consecutive pulley means to the third tubular member for simultaneous rotation therewith; and
    cable means attached to the pulley means and each of the first and second slider members which are transferring rotation of the pulley means to movement of the first and second slider members across the frame to vary the spacing between the first and second slider members.

12. The conformable member of claim 1 further including:
    means, responsive to the sensing means, for controlling the extension and retraction of the belts and the spacing between successive first and second slider members in response to the position of the user on the conformable member;
    the conformable means having processing means and a memory containing a stored control program;
    the control means executing the control program to initially store the output from the sensor means detecting the shape of a user of the conformable member in the memory and varying the position of the first and second slider members and the extension of each belt so as to conform the shape of each belt in the first and second slider members to the shape of the user of the conformable member.

13. The conformable member of claim 1 wherein the frame comprises first and second side panels having a planar, straight sided form joined by cross members.

14. The conformable member of claim 1 wherein the frame moves first and second side panels having a planar, arcuate shape joined by cross wise extending cross members.

15. The conformable member of claim 1 wherein the conformable member comprises a seat.

16. The conformable member of claim 1 wherein the conformable member comprises a bed.

17. The conformable member of claim 1 wherein the conformable member comprises a wheelchair.

18. The conformable member of claim 17 wherein the wheelchair is foldable about a center axis.

19. The conformable member comprising:
    a frame;
    first and second tubular members rotatably mounted on one side of the frame in a spaced apart arrangement;
    third and fourth tubular members rotatably mounted on an opposite side of the frame in a spaced apart arrangement;
    a plurality of belts disposed retractably on the frame and extending over the upper ends of the first and third tubular members;
    means for adjusting the shape of each belt individually to conform the shape of each belt to the shape and position of the body of the user on the conformable member; and
    means for sensing the shape and position of the user along successive portions of the conformable member.

20. The conformable member of claim 19 wherein the sensing means comprises:
    a plurality of bars mounted on the frame, one bar being associated with each belt;
    first and second resistance wires mounted in each bar and connected to a source of electrical power;
    a grounding wire mounted on each bar and spaced above the first and second resistance wires, the grounding wire being brought into engagement with and contacting selected portions of the first and second resistance wires by the belt as the user sits on the conformable member, the first and second resistance wire providing first and second voltage outputs.

21. The conformable member of claim 19 wherein the belt shaped adjusting means comprises:
- a plurality of channels mounted on the frame;
- first and second slider members mounted within each channel and movable along the length of each channel;
- each slider member having a channel engaging portion and a rib extending upward from the channel engaging portion;
- support means mounted on the upper end of the rib for supporting the belt thereon; and
- means for moving the first and second slider members in each successive channel to vary the shape of the belt between the first and second slider members in conformance with the shape of the user on the belt.

22. The conformable member of claim 21 further including means for varying the length of each belt.

23. The conformable member of claim 22 wherein the means for varying the length of each belt comprises:
- a plurality of spaced tubular section rotatably mounted in a spaced apart manner on opposite sides of the frame in alignment with the first and third tubular members;
- the conformable member of claim 21 further including:
- drive means for rotating the first and second tubular members;
- a first and second shuttle member slidably mounted within each of the first and second tubular members;
- flexible coupling means;
- third and fourth shuttle members;
- flexible coupling means connecting the first and third shuttle members and the second and fourth shuttle members together for simultaneous rotation and linear movement;
- third and fourth shuttle members being slidable through successive rotatable members to impart consecutive rotation to successively rotatable members.

24. The conformable member of claim 23 with a plurality means rotatably mounted on opposite sides of the frame;
- a first and second pair of slider members slidably movable between each pulley means, the slider members contacting the belts alter the shape of the belt resting thereon;
- a fourth shuttle member being successively movable through successive ones of the pulley means and engagable therewith for coupling rotation of the fourth shuttle to rotation of the pulley means to vary the spacing between the first and second slider means.

* * * * *